INVENTORS:
Don B. Carson
William R. Hennemuth

ATTORNEYS

Aug. 10, 1971  D. B. CARSON ET AL  3,598,542

FLUID CONTACTING APPARATUS FOR FLUID-SOLID CONTACTING CHAMBERS

Filed June 23, 1969  3 Sheets-Sheet 3

INVENTORS:
Don B. Carson
William R. Hennemuth
BY *James R. Hoatson, Jr.*
*Philip T. Liggett*
ATTORNEYS United States Patent Office 3,598,542
Patented Aug. 10, 1971

3,598,542
FLUID CONTACTING APPARATUS FOR FLUID-SOLID CONTACTING CHAMBERS
Don B. Carson and William R. Hennemuth, Mount Prospect, Ill., assignors to Universal Oil Products Company, Des Plaines, Ill.
Filed June 23, 1969, Ser. No. 835,679
Int. Cl. B01j 9/04
U.S. Cl. 23—288      26 Claims

ABSTRACT OF THE DISCLOSURE

An apparatus for contacting two fluids in a fluid-solids contacting zone, such as an adsorption zone or a reaction zone. A first fluid is passed into a central chamber having a plurality of fluid openings in the chamber wall, while a second fluid is passed into an annular chamber encompassing the central chamber and spaced apart therefrom. The second fluid is discharged via fluid openings in the inner annular chamber wall, into an annular space between the chambers, and the first fluid is discharged from the central chamber into the second fluid discharge. A resulting fluid mixture is passed from the annular space into a first conduit means confined within a second conduit means in a first direction of flow. The mixture is then passed into an annular passageway confined between the first and second conduit means in a second direction of flow substantially counter-current to the first direction of flow. The mixture is then passed from the annular passageway into a bed of particulated contact solids. Specific application is in hydrogenation, hydrotreating, hydrocracking, and hydrodealkylation reaction zones.

BACKGROUND OF THE INVENTION

The present invention relates to a method and apparatus for contacting two fluids in a fluid-solids contacting zone such as an adsorption zone or a reaction zone. More particularly, the invention is directed to the contacting of two fluids comprising a liquid phase and a vapor phase in a fluid-solids contacting zone, and to means and methods for effecting improved heat exchange between the vapor and liquid phases in the contacting vessel. More specifically, the invention relates to a new and improved method and apparatus for uniformly distributing mixed phases of vapor and liquid to a granular or particulated solids contacting zone, as in an adsorption tower or as in a catalytic reactor such as a hydrogenation, hydrotreating, hydrocracking, or a hydrodealkylation reactor.

Among the most important of the various commercial processes are those involving the physical or chemical treatment of hydrocarbons and other organic materials with bodies of granular or particulated solid contact materials. Many of these processes involve the contacting of two fluids with the contacting material, and often the two fluids will comprise a liquid phase and a gas or vapor phase. It has been the experience in the art, that the introduction of such mixtures of liquid and vapor into a bed of particulated contact solids in a uniformly distributed manner is difficult to achieve.

Typical of the art wherein uniform distribution of liquid and gas phases is necessary but infrequently achieved, is that of catalytic hydrotreating and catalytic hydrocracking of various hydrocarbon oils. It is well known that the feed to such a reaction zone comprises liquid hydrocarbon, vaporized hydrocarbon, and a hydrogen-rich gas, and that this feed is introduced into the reaction zone at an elevated temperature. It is further known that the reactions which are encountered in this catalytic environment are exothermic, and that the temperature of the vapor phase and of the liquid hydrocarbon phase is increased due to the exothermic heat of reaction. In order to avoid excessive temperature within the catalyst bed it is, therefore, typical to arrange the catalyst in a manner sufficient to provide for the introduction of diluent or quench vapors which are distributed between various regions of the catalyst bed during the reaction. The cool quench vapors, normally comprising hydrogen-rich gas, reduce the temperature of the reaction effluent passing from the upper regions of the bed, before the liquid-vapor mixture of hydrocarbon and hydrogen passes into the lower regions of the catalyst bed for further reaction.

It is typical in the art to introduce the quench hydrogen between the regions of the catalyst bed by means of a perforated pipe grid or other similar device which is positioned throughout the cross-section of the reactor vessel at the quench point. The effluent from the upper region of the catalyst bed thus flows down from the upper region throughout the cross-sectional area of the reactor, while the quench hydrogen is distributed by the perforated grid throughout the cross-sectional area of the reactor.

This prior art type of quench distributing apparatus of hydrogen quench grid distributor, is utilized with the intent of achieving a complete distribution of liquid and gas phases as uniformly as possible throughout the cross-sectional area of the reactor vessel and of the catalyst bed. It is also the purpose of this typical quench distributing apparatus to provide an intimate contact between hot effluent from the upper region of the bed and cool quench in order to achieve a uniform temperature of the constituents that pass into the catalyst below the quench point.

However, this typical prior art design has proven to be relatively ineffective in accomplishing these objectives. The problem is complicated by the fact that it is normal to add a relatively small amount of cool quench hydrogen to a large quantity of hot effluent comprising hydrocarbon and hydrogen which is flowing down from the upper region of the catalyst bed at an elevated temperature. The problem is additionally complicated by the fact that the amount of cold quench material is relatively small in relation to the large cross-sectional area which must be covered in order to maintain a proper uniform degree of fluid contacting and a proper distribution of liquid and vapor to the lower regions of the catalyst bed.

The problem is further complicated by the fact that there is a mixed-phase condition within the reactor itself. There is evidence that the heavier viscous liquids tend to channel down the side of the reactor whereas the less viscous liquids tend to channel in the central region of the catalyst bed with the vaporized hydrocarbon and hydrogen. The result is that the temperature encountered within the catalyst bed will be quite uneven and localized undesirable hot spots are often found in one or more regions of the bed. It is well known by those skilled in the art that the existence of the hot spots within the catalyst bed leads to indiscriminant or non-selective hydrocracking of the hydrocarbon constituents, which is an undesirable result.

Since the more viscous liquid tends to flow down through the upper region of the catalyst bed near the walls of the reactor, these viscous materials will also continue to channel along the walls in the lower regions of the bed. This results in an ineffective quench within the bed, and the resulting continuation of liquid channeling produces further danger of localized hot spots in the lower regions of the catalyst bed.

In order to alleviate the problems of channeling and incomplete contact between the reaction effluent and the quench hydrogen, in some prior art installations the reaction zone is divided into a plurality of superimposed fixed catalyst beds within the reaction vessel. The upper catalyst beds are held and retained upon a perforate support plate member, and the quench hydrogen is introduced by means of a perforated pipe grid or similar distributing device located immediately below the perforated catalyst support plate. In this manner the hot effluent from the catalyst bed above, is redirected by the support plate to the perforations therein. The effluent then rains down through the perforations, past the hydrogen quench pipe grid, and into the catalyst bed below. As the hot mixture of vapor and liquid effluent flows past the pipe grid distributor, the quench hydrogen contacts the hot effluent and cools this material. In the preferred installation of this type of catalyst support and fluid distributing apparatus, comprising a perforated catalyst support plate and a hydrogen quench grid distributor, it is intended that the hot effluent will rain down uniformly across the pipe grid throughout the cross-section of the reactor while the quench hydrogen is uniformly distributed between the catalyst beds by the quench distributor throughout the cross-sectional area of the reactor.

However, this typical prior art design comprising the perforated catalyst support plate and hydrogen quench grid distributor has been found to be relatively ineffective in accomplishing the objectives of intimate contact and thermal quench for the reasons which have been set forth hereinabove concerning the introduction of quench at intermediate points in a single catalyst bed. That is to say, that despite the use of perforated catalyst support plates and the partitioning of the catalyst into separate fixed beds within the reactor, the ratio of cool quench hydrogen to hot effluent remains extremely small and contacting of cool quench with hot effluent throughout the entire cross-section of the reactor remains difficult to achieve. In addition, the problems of channeling of the hot effluent in the catalyst bed above, often are not eliminated by the use of the perforated catalyst support plate. As noted hereinabove, the more viscous liquid tends to flow along the wall of the reactor vessel. The channeling of these viscous liquids often continues as the effluent passes through the perforated support plate, so that the amount of liquid passing the hydrogen quench distributor is not constant throughout the reactor cross-section. Thus, despite the use of the perforated catalyst support plate, ineffective quench between catalyst beds occurs and liquid channeling continues, thus, producing further danger of localized hot spots in the catalyst beds below.

In addition, it must be noted that once a reactor vessel is constructed and installed for the accommodation of a single bed of catalyst with internal hydrogen quench at one or more quench points, it is difficult to partition the catalyst bed into a plurality of separate superimposed beds held and retained on support plate members. This is because a single bed reactor vessel typically is not provided with internal support means such as support lugs or rings for future installation of catalyst support plates. In order to partition a single catalyst bed into a plurality of fixed catalyst beds once the reactor vessel has been commercially constructed, the support rings or lugs for the accommodation of the catalyst support plate members must be installed in the field. Such field installation creates problems in that residual stresses are thereby produced in the shell of the reactor vessel. While the vessel is being fabricated in the shop, such residual stresses are eliminated by well known techniques of stress relieving. However, stress relieving on a commercial reactor vessel in the field is difficult to achieve since the reactor vessel typically is a large mass of metal and the reactor shell, upon which the support lugs or rings must be installed, has a heavy wall thickness. In addition, field stress relieving is not usually completely successful, and those skilled in the art know that failure to properly stress relieve the reactor vessel may cause the vessel wall to fail and rupture at operating pressure. Furthermore, reactor vessels of the type herein described are fabricated from metal alloys which are limited in the number of permissible hours of stress relieving. Thus, any stress relieving done in the field must accumulate upon the number of hours of stress relieving done in the fabricating shop. The total number of hours then may exceed the permissible number of hours, and thereby cause a reduction in the tensile strength of the metal. The reduction in tensile strength, in turn, requires that the commercial operation of the reactor vessel be undertaken at a reduced pressure in order that any danger of failure of the vessel wall at normal operating pressure may be eliminated. As is well known to those skilled in the art, reduction of operating pressure for a specified catalytic reaction will typically cause reduction in product yield, which is an undesirable result.

SUMMARY OF THE INVENTION

It is, therefore, an object of the present invention to provide an improved method and apparatus for contacting two fluids in a fluid-solids contacting zone, such as an absorption zone or a reaction zone.

It is another object of this invention to provide an improved method and apparatus for contacting and distributing mixed phases of vapor and liquid in such contacting zones.

It is yet another object of this invention to provide a fluid distribution means whereby greatly improved mixing of vapor and liquid phases occurs at their point of introduction into a solid contacting zone.

It is a further object of this invention to provide a means of improving heat exchange between a liquid phase and a vapor phase, passing to a fluid-solids contacting zone in a uniformly distributed manner at a substantially uniform temperature.

It is a still further object of this invention to provide a novel apparatus for partitioning a bed of particulated contacting solids within a contacting vessel in a manner sufficient to provide that the apparatus is self-supporting and does not require support from, or attachment to, the wall of the contacting vessel.

These and other objectives and the advantages of the present invention will become more readily apparent to those skilled in the art as the summary of the invention is more fully set forth hereinafter.

In the present invention, these objectives are achieved by the use of a novel combination catalyst support and effluent redistribution apparatus, wherein there is incorporated a novel means for injecting the quench hydrogen into the effluent which passes from the catalyst bed above to the catalyst bed below, in a reaction zone wherein the catalyst bed has been partitioned into a plurality of separate superimposed beds.

One embodiment of the invention is clearly set forth in FIG. 1 wherein there is illustrated a partially cut-away elevational view of a typical hydrocracking reactor vessel, partitioned into a plurality of catalyst beds supported upon the novel catalyst support and fluid distribution apparatus, wherein the upper catalyst beds are supported upon the novel apparatus which is self-supporting and requires no internal lugs or rings on the reactor wall for support.

FIGS. 2 and 3 comprise sectional elevational views of the inventive catalyst support and fluid distribution apparatus, wherein the elements comprising the apparatus are clearly set forth with particularity. These two embodiments comprise the inventive apparatus in a simplified combination of elements.

FIGS. 4 through 6 comprise a particularly preferred embodiment of the inventive fluid distribution and contacting apparatus for large diameter reactor vessels. FIG. 4 is a sectional elevational view of the apparatus while FIGS. 5 and 6 comprise sectional plan views of the apparatus shown in FIG. 4.

In one preferred embodiment of the present invention as applied to a downflow catalytic reaction zone, the fluid distribution and contacting apparatus comprises a catalyst support plate for holding and retaining the catalyst bed above. The support plate comprises a perforated annular section surrounding and encompassing a substantially imperforate center section. Attached below the perforate annular section of the catalyst support plate is an annular chamber containing a plurality of fluid openings in the inner annular chamber wall. Attached below the substantially imperforate center section of the catalyst support plate is a substantially confined central chamber having a plurality of fluid openings in the chamber wall. The annular chamber encompasses the central chamber and is spaced apart therefrom in a manner sufficient to provide an annular space between the chambers. Attached to the annular chamber and extending for a substantial distance below, is a first conduit means which encloses and encompasses a second conduit means in a manner sufficient to provide an annular passageway between the conduit means. The second conduit means is attached to the annular chamber in a manner sufficient to provide communication of the annular space with the second conduit means, but not with the first conduit means or the annular passageway. The first conduit means has an open end immediately below the annular space which is isolated therefrom. The first conduit means also has a closed end a finite distance from the annular chamber.

In a second preferred embodiment of the present invention, the fluid distributing and contacting apparatus which has been summarized in the paragraph above has a support plate member which comprises an imperforate annular section surrounding and encompassing a perforated central section, and the annular chamber is attached below the imperforate annular section, while the central chamber is attached below the perforated central section.

In the embodiments wherein the fluid contacting and distributing apparatus is a unit within a catalytic reaction vessel, the first conduit means provides a tubular supporting column for holding and supporting the annular chamber, the central chamber, the second conduit means contained within the first conduit means, and the catalyst bed which is supported on the support plate member of the apparatus. The apparatus thus does not require support from, or attachment to the walls of the reactor vessel.

The method of contacting two fluids within the inventive apparatus may be understood in reference to the first embodiment thereof, which was set forth hereinabove. The effluent from the catalyst bed above passes through the perforated annular section of the catalyst support plate and into the annular chamber below. Quench hydrogen is introduced by conduit means into the central chamber attached below the imperforate center section of the catalyst support plate. The hot effluent is discharged into the annular space via the fluid openings contained in the inner annular wall of the annular chamber. Simultaneously, the quench hydrogen is discharged into the annular space via the fluid openings in the wall of the central chamber. Preferably, the effluent discharge and quench hydrogen discharge impinge upon one another axially in order to produce a region of high turbulence within the annular space and thereby produce a homogeneous mixture of substantially uniform temperature. The mixture of quench hydrogen and cooled effluent then passes from the annular space into the second conduit means, and is thereby discharged below into the first conduit means at the closed end thereof. The mixture of quench hydrogen and cooled effluent then passes up into the annular passageway confined between the first and second conduit means. The mixture flows up the annular passageway to the open end of the first conduit means which is directly below the annular space and isolated therefrom. The mixture of quench hydrogen and cooled effluent is then discharged from the open end of the first conduit means into the catalyst bed below.

In summary, therefore, one broad embodiment of the present invention may be characterized as a method for contacting two fluids in a fluid-solids contacting zone which comprises, passing a first fluid into an annular chamber having a plurality of first fluid openings in the inner annular wall of the chamber; passing a second fluid into a central chamber having a plurality of second fluid openings in the chamber wall; discharging the first fluid from the first fluid openings into an annular space between the annular chamber and the central chamber; discharging the second fluid from the second fluid openings into the annular space, whereby the first and second fluids are directly contacted and a mixture of first and second fluids is produced; passing the mixture from the first annular space into a first conduit means in a first direction of flow; passing the mixture from the first conduit means into a second conduit means enclosing and containing the first conduit means in a manner sufficient to provide an annular passageway confined between the first and second conduit means; passing the mixture into the annular passageway in a second direction of flow substantially countercurrent to the first direction of flow, whereby additional contacting of the first and second fluids is produced within the mixture; and, discharging the mixture from the annular passageway into a bed of particulated solids.

As noted hereinabove, the present invention may further be characterized as the method set forth in the paragraph immediately above wherein the second fluid is discharged substantially axially and directly into the first fluid discharge.

In addition, the present invention may be broadly characterized as a fluid contacting means which comprises in combination, a central chamber having a plurality of first fluid openings spaced in the chamber wall; an annular chamber spaced around and apart from the central chamber having a plurality of second fluid openings spaced in the inner annular wall of the annular chamber; means for attaching the central chamber to the annular chamber in a manner sufficient to provide between the chambers, a first annular space having communication with the first and second fluid openings, and having one closed end and one open end; a first conduit means having a closed end space apart from the first annular space and having an open end adjacent to the open end of the annular space; a second conduit means disposed within the first conduit means in a manner sufficient to provide a second annular space, and having a first open end adjacent to the closed end of the first conduit means, and having a second open end adjacent to the open end of the first conduit means; means for attaching the second open end of the second conduit means to the annular chamber in a manner sufficient to provide that the second conduit means is in communication with the first annular space, and that the open end of the first conduit means is isolated therefrom; means for attaching the first conduit means to the annular chamber; a first fluid passageway communicating with the central chamber; and, a second fluid passageway communicating with the annular chamber.

A still further broad embodiment of the present invention may be characterized as a fluid contacting chamber which comprises in combination a vertically elongated confined chamber having at least one upper fluid port and one lower fluid port to provide for a generally vertical flow of fluid therethrough; a plurality of horizontally positioned support plate members spaced within the elongated chamber, and partitioning the elongated chamber into a plurality of isolated zones; a confined central chamber attached to each support plate member, and having a plurality of first fluid openings spaced in the chamber wall; an annular chamber attached to each support plate member spaced around and apart from the associated attached central chamber in a manner sufficient to provide a first annular space between the associated chambers, and having a plurality of second fluid openings in the inner annular wall of the annular chamber; a first conduit means attached to each annular chamber, having a closed end spaced apart from the associated first annular space and having a open end adjacent thereto; a second conduit means having both ends open, disposed within each first conduit means in a manner sufficient to provide a second annular space, and attached to the associated annular chamber in a manner sufficient to provide that the second conduit means is in communication with the associated first annular space and thereby with the associated first and second fluid openings, and sufficient to provide that the open end of the associated first conduit means is isolated therefrom; a first fluid passageway communicating with each confined central chamber; and a second fluid passageway communicating with each annular chamber.

The present invention may also be broadly characterized as the fluid contacting chamber of the paragraph immediately above wherein the chamber comprises a fluid-solids contacting chamber, and the support plate members hold and retain particulated solids in a plurality of separate superimposed beds.

A clearer understanding of the present invention may now be obtained by referring to the accompanying figures.

DESCRIPTION OF THE FIGURES

As noted hereinabove, one particularly preferred embodiment wherein the present invention finds application is in exothermic hydrocarbon conversion processing over particulated conversion catalyst. For illustrative purposes the drawing of FIG. 1 shows an embodiment of the invention wherein a hydrocarbon fraction is hydrocracked in the presence of hydrogen over a suitable hydrocracking catalyst.

Figure 1:
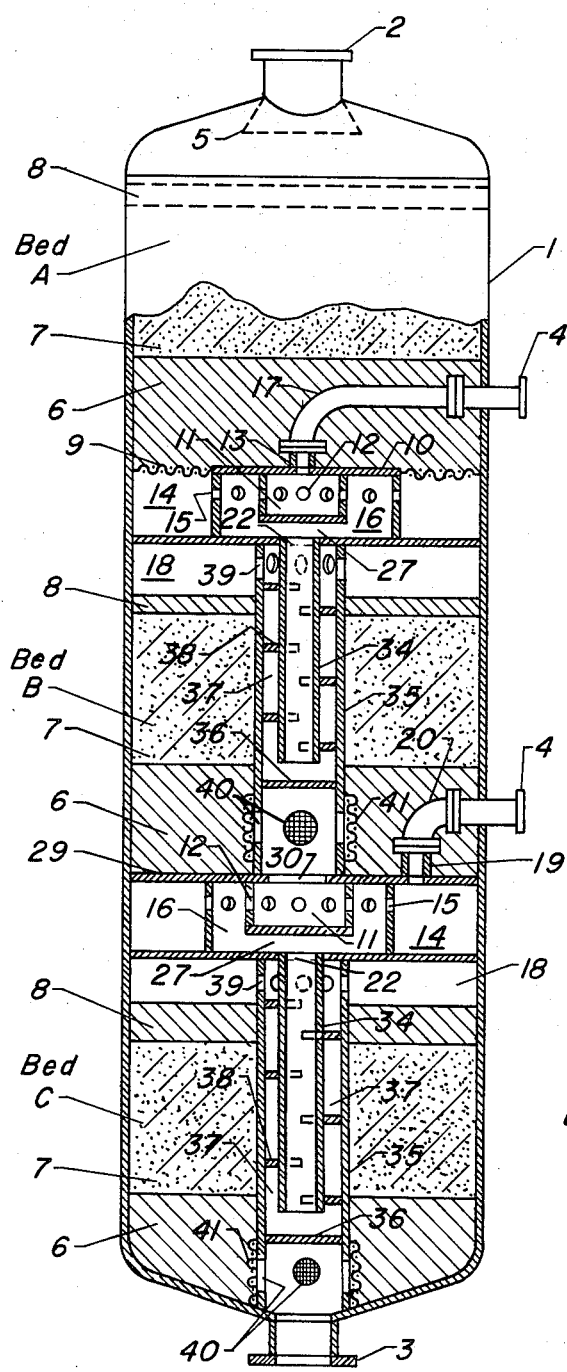
FIG. 1 shows a partially cut-away elevational view of a hydrocracking reactor vessel comprising a vertically elongated shell 1 having a fluid inlet nozzle 2 at the top of the shell and a fluid outlet nozzle 3 at the bottom of the shell. Reactor vessel 1 contains three catalyst beds, beds A through C, with the upper two beds supported upon an embodiment of the inventive catalyst support and fluid distribution apparatus. Attached to the reactor shell 1 there are also provided hydrogen quench ports 4. At the top of reactor shell 1 and below the fluid opening 2 is a distributing device 5 which distributes incoming reactant fluid uniformly across the top of the upper catalyst bed.

The catalyst beds contain a typical hydrocracking catalyst which may be present in pilled, spherical, or extruded form. The particulated catalyst particles 7 are supported upon a layer of inert support material 6. The support material 6 may comprise ceramic balls, Berl Saddles, Raschig Rings or any other inert packing material which is typically used in hydrocarbon conversion reactors for supporting beds of particulated catalyst. In addition, each bed contains a similar layer of inert support materials 8 at the top of the catalyst particles 7. This upper layer of inert support material is used as a means for holding down the low density particles of catalyst 7 in case of pressure fluctuations, and for enhancing distribution of fluid which enter at the top of each bed.

The catalyst Bed A, comprising catalyst particles 7, lower support layer 6, and covering layer 8, is held and retained upon a catalyst support plate member or deck which comprises a perforated annular section 9 encompassing a substantially imperforate center section 10. For illustrative purposes, perforated annular section 9 is shown as a woven screen section. The Catalyst Bed B is held upon a catalyst support plate member comprising a substantially imperforate annular section 29 encompassing a perforated center section 30. The Catalyst Bed C is held upon the bottom of the reactor vessel 1.

Referring now to the catalyst support plate member which holds and retains the Catalyst Bed A, it will be seen that there is attached below the imperforate center section 10, a central chamber 11 having a plurality of fluid openings 12 in the vertical wall of the chamber. Centrally disposed in the imperforate center section 10 is a fluid inlet port 13 which provides for the flow of quench hydrogen into the central chamber 11 from hydrogen quench nozzle 4 via conduit means 17.

Also attached below the catalyst support plate member which holds and retains Catalyst Bed A, is an annular chamber 14 which comprises as its upper chamber wall the perforated annular section 9 of the catalyst support plate. Annular chamber 14 contains a plurality of fluid openings 15 in the inner annular wall of the chamber. Annular chamber 14 encompasses central chamber 11 and is spaced apart therefrom in a manner sufficient to provide an annular space 16 between the chambers.

Attached to the annular chamber 14 there is shown an outer conduit means 35 and an inner conduit means 34. The inner conduit means 34 has communication with the annular space 16 and with fluid openings 12 and 15 via opening 22 which is positioned below the central chamber 11. The outer conduit means 35 encompasses the inner conduit means 34 in a manner sufficient to provide an annular fluid passageway 37 between the two conduit means. Outer conduit means 35 has a closed end provided by an internal head or partition plate 36, and an open end provided by fluid openings 39 which are adjacent to the annular chamber 14 and the annular space 16 but which are isolated therefrom. The annular fluid passageway 37 contains a plurality of baffle means 38 which provide for a torturous path of flow in order to enhance mixing of fluid passing through the annular passageway.

The lower section of the outer conduit means 35 located below the partition plate 36 contains a plurality of fluid openings 40 which are covered by perforated screen means 41. This lower section of the outer conduit means 35 is supported upon the catalyst support plate member which holds Catalyst Bed B and it provides a fluid communication with the central chamber 11 which is positioned below the support plate member of Catalyst Bed B, and encompasses fluid opening 30.

As was noted hereinabove, the catalyst support plate member which holds and retains Catalyst Bed B comprises a substantially imperforate annular section 29 and a perforated center section or hole 30. Attached below the support plate member and comprising an outer annular portion of the imperforate annular section 29 is an annular chamber 14, similar to that described hereinabove, containing a plurality of fluid openings 15. Attached below the support plate member and encompassing the perforate section or fluid opening 30 is a central chamber 11, similar to that described hereinabove, which contains a plurality of fluid openings 12 in the chamber wall. In addition, there is shown under the support plate member holding the Catalyst Bed B, the annular space 16, the inner conduit means 34, and outer conduit means 35 which comprise the major elements of the inventive catalyst support means and fluid contacting apparatus. The other elements of the contacting apparatus which supports Catalyst Bed B are identical to those which have been described in the paragraphs hereinabove relative to the apparatus which holds and retains Catalyst Bed A.

However, it will be see in FIG. 1 that the annular chamber 14 under Catalyst Bed B, is in communication with hydrogen quench nozzle 4 by means of a fluid inlet port 19 and a fluid conduit means 20. Thus, the catalyst support and fluid contacting apparatus which holds and retains Catalyst Bed B is a second embodiment of the support and fluid contacting apparatus which is distinct from the embodiment described relative to the support of Catalyst Bed A.

It will be seen further in FIG. 1, that each of the two embodiments of the catalyst support and fluid contacting apparatus which partitions reactor vessel 1 into a plurality of individual catalyst beds, is supported upon a central column comprising the outer conduit means 35. All elements of the fluid contacting apparatus are attached to and supported by outer conduit means 35, and neither the apparatus nor any element thereof is attached to or supported from the reactor vessel wall 1.

In the typical hydrocracking process to which the instant invention is directed, a feed comprising liquid hydrocarbon, vaporized hydrocarbon, and a hydrogen-rich gas enters reactor vessel 1 via inlet nozzle 2 and fluid distribution means 5. This feed mixture passes through the first Catalyst Bed A and is increased in temperature due to the hydrocracking reaction which occurs therein. As the feed and resulting effluent pass through Catalyst Bed A, the vapor portion will typically tend to flow down the central region of the catalyst bed, while the liquid portion will tend to channel down the reactor walls and along the outer regions of the catalyst bed. The liquid and vapor phases upon passing through Catalyst Bed A, enter the annular chamber 14 through the fluid passageway which is provided by the perforated annular section 9 of the catalyst support plate member. Annular chamber 14 provides a reservoir within which channeling liquids may be remixed to provide a relatively homogeneous liquid hydrocarbon phase and to eliminate the concentration effect which occurs due to the channeling of liquid in Catalyst Bed A. The hot effluent comprising liquid hydrocarbon, vaporized hydrocarbon and hydrogen-rich gas is discharged from annular chamber 14 into the annular space 16 via fluid openings 15.

Simultaneously the quench hydrogen enters the reactor via hydrogen port 4 and passes into the central chamber 11 via conduit means 17 and inlet port 13. The cool quench hydrogen is discharged into the annular space 16 via fluid openings 12. Preferably, fluid openings 12 are in substantially axial radial alignment with fluid openings 15 so that the hydrogen quench discharge passes directly into the hot effluent discharge to provide a region of high turbulence within annular space 16. The resulting mixture of effluent and quench hydrogen leaves the annular space 16 at a substantially uniform temperature and passes through fluid opening 22 into the inner conduit means 34.

The mixture of Catalyst Bed A effluent and quench hydrogen, passes down inner conduit means 34 and is discharged from the lower end thereof against partition plate 36. The mixture is thereby redirected upward into the annular passageway 37, which is confined between conduit means 34 and 35. As noted hereinabove, fluid passageway 37 contains a plurality of horizontally positioned baffle means 38 which provide a torturous upward flow path and enhance mixing of the hot effluent and the quench hydrogen. The mixture is then discharged from the upper end of outer conduit means 35 via fluid opening 39 into space 18, and is passed therefrom as a substantially homogeneous mixture of liquid, vapor, and gas at a substantially uniform temperature, in a uniform distribution pattern into the top of Catalyst Bed B.

As the mixture of quench hydrogen and Catalyst Bed A effluent passes through Catalyst Bed B, additional hydrocracking occurs. The resulting mixture of Catalyst Bed B effluent passes through perforate means 41 and into fluid openings 40 of the outer conduit means 35. This fluid mixture then passes downwardly and through fluid opening 30 which is the perforated center section of the catalyst support member holding and retaining the Catalyst Bed B, and additionally holding and retaining the fluid contacting means which supports the Catalyst Bed A by means of the outer conduit 35. The Bed B effluent fluid comprising liquid hydrocarbon, vaporized hydrocarbon, and hydrogen gas passes into central chamber 11 via fluid opening 30, and any channeling fluid is thus remixed, at least in part, in central chamber 11 before being discharged via openings 12.

The effluent from Catalyst Bed B having been additionally hydrocracked, has an elevated temperature and must be further quenched. The effluent, therefore, is passed from the central chamber 11 into the annular space 16 below the imperforate section 29 of the catalyst support plate member holding the Catalyst Bed B. Simultaneously, quench hydrogen passes from inlet port 4 into the annular chamber 14 below the substantially imperforate annular section 29, by means of the fluid conduit 20 and the fluid inlet port 19. The Catalyst Bed B effluent is discharged via fluid openings 12 and simultaneously the quench hydrogen is discharged via fluid openings 15 into the annular space 16 below Catalyst Bed B. The quench hydrogen and the effluent from Catalyst Bed B pass downflow via opening 22 and inner conduit means 34, and then pass upward via the annular passageway 37 in the manner which has been described hereinabove in reference to the effluent from Catalyst Bed A.

The mixture comprising Catalyst Bed B effluent and quench hydrogen is then discharged via fluid openings 39 and open space 18, at a substantially uniform temperature into the Catalyst Bed C wherein further hydrocracking will occur. The Catalyst Bed C effluent, comprising hydrocracked liquid hydrocarbon, hydrocarbon vapor and hydrogen gas, then passes out of the reaction vessel 1 via fluid openings 40 in the bottom section of the outer conduit means 35 and via fluid outlet port 3 in the bottom of the reactor vessel 1. This effluent is passed to separation processing wherein various components of the effluent are separated by well known prior art techniques for recovery of the desired hydrocarbon products.

Figure 2:
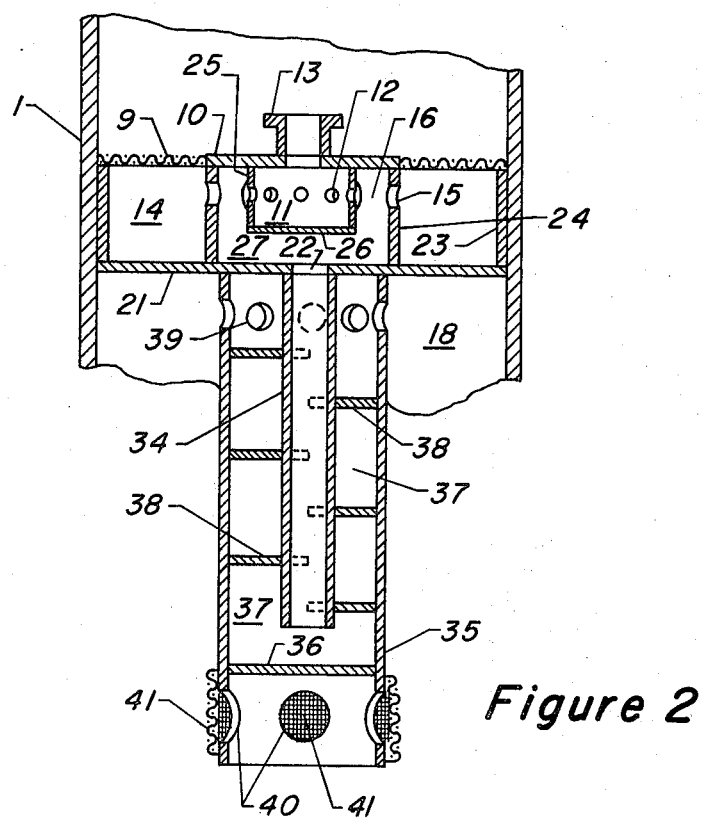

FIG. 2 illustrates typical elements comprising the inventive catalyst support and fluid distribution or contacting apparatus of FIG. 1 as shown in vertical section. In particular, the embodiment illustrated in FIG. 2 shows the elements of the inventive apparatus which supported Catalyst Bed A of FIG. 1.

Referring now to FIG. 2 there is shown a portion of the reactor shell 1. For ease in discussion, the catalyst above the support apparatus is not shown in the drawing. As noted hereinabove, the entire apparatus is not attached or supported in any manner on the vertical wall of the reactor 1. Rather, the entire combination of elements is supported by the column which is provided by outer conduit means 35. Supported upon outer conduit means 35 and attached thereto is a lower support plate member 21 having a central hole 22. Support plate 21 thus has an annular configuration and provides the floor or bottom wall for the annular chamber 14. Rising vetrically above support plate 21 and adjacent to the reactor shell 1 is a support skirt 23. The support skirt provides the outer annular wall of the annular chamber 14. Also rising above support plate 21 adjacent to the central hole 22 is the inner annular wall 24 of the annular chamber 14. The inner annular wall 24 contains a plurality of fluid openings 15 which provide communication of the annular chamber 14 with the annular space 16.

As noted in FIG. 1 relative to Catalyst Bed A, the catalyst support plate member or deck of the inventive apparatus comprises a perforated annular section 9 and a substantially imperforate center section 10. The perforated annular section 9 provides the roof or top wall of annular chamber 14 and simultaneously provides the fluid inlet means or passageway for the flow of effluent from the catalyst bed above (not shown) to the annular chamber 14.

Attached to the bottom of the imperforate center section 10 is central chamber 11 formed by the vertical wall 25 and a lower wall or bottom plate 26 attached thereto. The vertical wall of the central chamber 25 contains a plurality of fluid openings 12 which provide communication of the central chamber 11 with the annular space 16. The center of the imperforate section of the upper roof or wall of the chamber 11 contains the fluid port 13 which provides an inlet means or passageway for the introduction of quench hydrogen as noted in the discussion relative to Catalyst Bed A in FIG. 1.

In the embodiment shown in FIG. 2, in addition to the annular space 16 between the central chamber 11 and the annular chamber 14, there is shown a space 27 located below the central chamber 11 and above the hole 22 in the lower support plate 21. In a preferred embodiment, hole 22 should have a diameter smaller than the dimension of the central chamber 11, so that the fluids are baffled inwardly from the annular space 16 to hole 22. This change of downward flow in annular space 16, to inward flow horizontally in space 27, to downward flow via hole 22 and inner conduit means 34, provides added mixing of the reaction effluent and the hydrogen quench.

As noted hereinabove, support plate member 21 is attached to the supporting column which holds the entire apparatus and which comprises the outer conduit means 35. Attached to the support plate member 21 and encompassing the hole 22 there is shown the inner conduit means 34. In addition, the fluid passageway having an annular configuration 37, is clearly shown to contain a plurality of horizontally positioned baffle means 38.

FIG. 2 also shows the manner in which the outer conduit means 35 is provided with one closed end and one open end in a manner sufficient to produce the annular fluid passageway 37. It will be seen that near the bottom section of the outer conduit means 35 there is provided an internal head or partition plate 36, while at the upper end of the conduit means 35 there is provided a plurality of fluid openings 39. At the bottom section of outer conduit means 35 there is shown the plurality of fluid openings 40 which allow the fluid to flow inwardly and into the support plate member of the Catalyst Bed B below. Covering each fluid opening 40 there is a perforated means 41 which may be a woven screen section or other perforated device sufficient to allow the flow of fluid but to retain the particulated contact solids of the catalyst bed.

Figure 3:
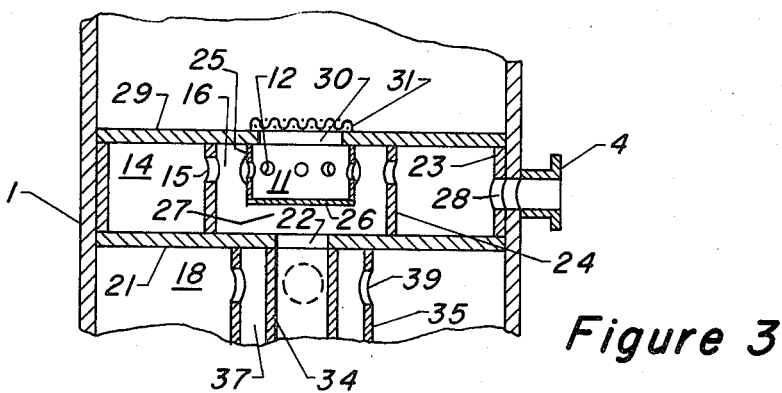

A further embodiment of the apparatus shown in FIG. 2 may be provided by changing the hydrogen quench passageway from the central chamber to the annular chamber as illustrated in sectional elevation in FIG. 3. The elements of FIG. 2 are again repeated in the construction of the apparatus shown in FIG. 3 with several modifications, however. By comparing FIGS. 2 and 3 it will be seen that in the embodiment of FIG. 3, the hydrogen quench nozzle 4 is in communication with the annular chamber 14 by means of a fluid opening 28 which is provided in the wall of the reactor shell 1 and in the support skirt 23 which forms the outer wall of the annular chamber 14. In addition, the upper catalyst support plate member or deck which holds and retains the catalyst bed, not shown, comprises an imperforate annular section 29 encompassing a perforated center section comprising a hole 30 in the support plate 29 and a perforate means 31 covering this opening. In effect then, the embodiment illustrated in FIG. 3 affords one modification of the embodiment which has been previously disclosed in FIG. 1 as the catalyst support and fluid contacting apparatus which holds and retains Catalyst Bed B of FIG. 1.

In the embodiments shown in FIGS. 1 through 3, it is preferred that the central chamber 11 have a cylindrical configuration. It is also preferred that the plurality of fluid openings 12 be radially spaced in a substantially uniform manner in the cylindrical wall 25. The fluid openings 12 may be oriented so that discharging fluid passes through openings 12 and impinges on the wall 24 of the annular chamber in a manner sufficient to provide turbulence within the annular space 16. Additionally, the fluid openings 15 preferably are radially spaced in a substantially uniform manner in the inner annular wall 24 of the annular chamber 14. Fluid openings 15 may be oriented in a manner sufficient to provide that the discharging fluid will impinge upon the wall 25 of central chamber 11 in a manner sufficient to provide turbulence within the annular space 16. However, it is a preferred embodiment that the fluid openings 12 and 15 be equal in number and in substantially axial radial alignment in order that the discharging fluid passing through openings 12 impinges upon the discharging fluid passing through openings 15, so that the two fluids are given a most direct and forceful mixing effect within the annular chamber 16.

Figure 6:
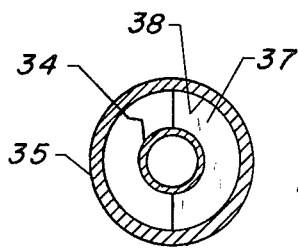
Figure 4:
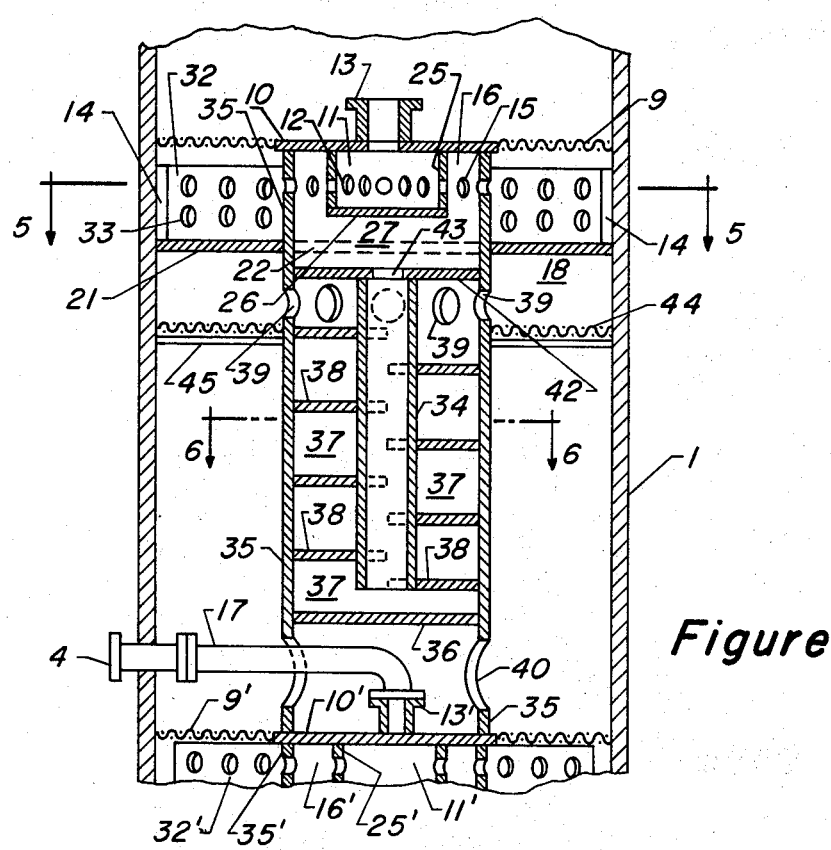
Figure 5:
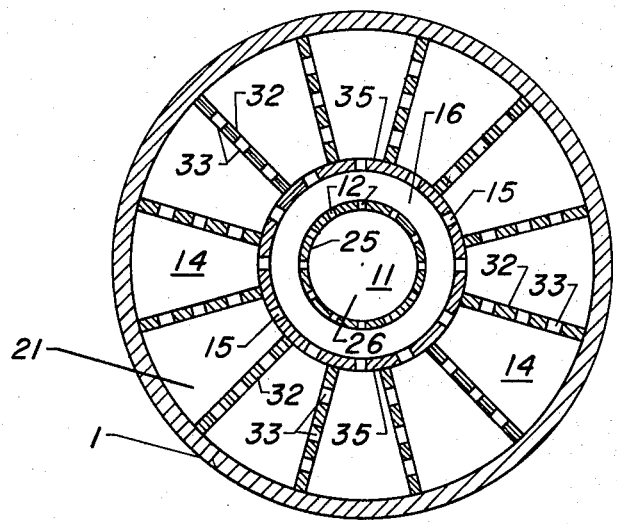

The embodiments of the fluid distributing or contacting apparatus which have been illustrated in FIGS. 1 through 3 comprise only a few embodiments of the present invention. In FIGS. 4 through 6 there is shown a particularly preferred embodiment of the inventive apparatus as applied to a large diameter fluid contacting vessel. FIG. 4 provides a sectional elevational view of this alternate preferred embodiment. FIGS. 5 and 6 provide sectional plan views of the alternate embodiment of FIG. 4.

Referring now to FIG. 4, there is shown a portion of the vertically elongated shell 1 and the lower support plate 21 having a central opening 22. Passing through the central opening 22 and confined therein by the lower support plate 21 is an upper section of the outer conduit means 35 which comprises the inner annular wall of annular chamber 14. The support skirt 23 which was provided in the embodiments of FIGS. 2 and 3 is not so provided in this embodiment and the required support of the upper support plate or deck retaining the catalyst bed above is provided by bearing beam members in a manner to be disclosed hereinafter. The inner annular wall of the annular chamber 14 which comprises the upper section of the outer conduit means 35 supports the center imperforate section 10 of the catalyst support plate. The imperforate section 10 has the fluid inlet port 13 centrally disposed therein. Below the imperforate section 10 is the central chamber 11 comprising the vertical chamber wall 25 and the chamber bottom wall or floor plate 26. The chamber wall 25 contains the plurality of fluid openings 12, while the upper section of the outer conduit means 35 which comprises the inner annular wall of annular chamber 14 contains a plurality of the fluid openings 15.

Extending radially from the inner annular chamber wall comprising the upper section of outer conduit means 35 to the reactor shell 1 is a plurality of support beam members 32 which divide the annular chamber 14 into a plurality of annular sectors. Each support beam member 32 preferably contains a plurality of fluid openings 33 in order that the annular sectors formed by the support beam members 32 are in fluid communication with each other. Beam members 32 are shown as having a plate configuration but they may have any cross-sectional shape, such as, an angle, T, channel, I-beam or other configuration. The support beam members 32 support the perforated annular section 9 of the upper support plate member or deck which retains and holds catalyst above.

FIG. 5 provides a sectional plan view of the inventive fluid distributing and contacting apparatus of FIG. 4 as taken along line 5—5. In FIG. 5, there is shown the reactor shell 1 and the inner annular wall 35 of the annular chamber 14. There is also shown a cylindrical wall 25 of the central chamber 11. The inner annular wall 35 contains the plurality of fluid openings 15 which are disposed therein in a substantially axial radial alignment with the plurality of fluid openings 12 in the wall 25 of the central chamber 11. FIG. 5 also shows the annular space 16 which is provided between the two chambers as well as the lower support plate 21 and the bottom wall plate 26.

It will be clearly seen in FIG. 5 that the annular chamber 14 is divided into a plurality of annular sectors by the bearing beam members 32. It is also apparent that each annular sector contains one fluid opening 15, although those skilled in the art realize that more than one fluid opening 15 may be provided in any annular sector. There is also shown in FIG. 5 the plurality of fluid openings 33 within each support beam member 32. Thus it is readily ascertainable to those skilled in the art that the annular chamber 14 is divided into a plurality of annular sectors by the support beam members 32 which support the perforated annular section 9 of the upper support plate member which holds and retains the particulated contact solids in the bed above.

It is further apparent from FIGS. 4 and 5 that the annular sectors of annular chamber 14 are in fluid communication with each other by means of the fluid openings 33 in the support beam members 32. Thus if effluent channeling down from the catalyst bed above, does so in a manner which causes liquid to become concentrated in one area of the annular chamber, this concentrated liquid will be redistributed to the adjacent annular sectors of the annular chamber 14 via fluid openings 33. Fluid openings 33 thus provide for a more uniform distribution of effluent liquids which are thereafter discharged from the annular chamber 14 into the annular space 16.

Referring now again to FIG. 4, there is shown the annular space 16 between the annular chamber 14 and the central chamber 11. There is additionally shown, the open space 27 below the central chamber 11 and above support plate 42 having fluid opening 43. Support plate 42 has inner conduit means 34 attached below and thereby provides a means for internal support for conduit means 34. It will be seen in FIG. 4 that the annular configuration of the support plate 42 is such as to provide a baffling effect to the flow of fluids within annular space 16 and open space 27. The diameter of the fluid opening 43 in the support plate 42 is smaller than the diameter of the central chamber 11. Therefore, the fluid mixture flowing downwardly from annular space 16 is baffled horizontally to the center for subsequent downward passage through the fluid opening 43 and thereby given a further mixing effect.

As noted previously, an upper section of outer conduit means 35 comprises the inner annular wall of the annular chamber 14 and contains a plurality of fluid openings 15. These fluid openings for purposes of definition, do not comprise the open end of outer conduit means 35 since fluid openings 15 provide an internal passageway for fluids. Fluid openings 15 are an internal passageway in that they provide fluid communication between the annular chamber 14 and the annular space 16. The open end of outer conduit means 35 is provided by a plurality of fluid openings 39 which do not provide fluid communication between internal zones, but rather provide a means of discharge for the fluid mixture from the apparatus. It will be seen that fluid openings 39 are located adjacent to the inner support plate 42 and adjacent to the lower support plate 21, and that they are isolated from annular space 16. The closed end of outer conduit means 35 is provided by the internal head or partition plate 36 as has been previously defined in the embodiments disclosed in the prior figures.

Confined within the external conduit means 35 is the internal conduit means 34 which extends downwardly from internal support plate 42 to within a short distance of the partition plate 36. As noted hereinabove, there is confined between the inner conduit means 34 and the outer conduit means 35, a fluid passageway of annular configuration 37. In order to provide increased turbulence and thereby effect greater contacting and mixing of the fluid passing from the catalyst bed above, not shown, the annular passageway 37 contains a plurality of baffle means 38. Baffle means 38 are preferably horizontally positioned plates having the configuration of an annular sector.

The configuration of the baffle means 38 within the annular fluid passageway 37 is more clearly set forth in FIG. 6 which comprises a sectional plan view as taken along line 6—6 of FIG. 4. Referring now to FIG. 6 there is shown the outer conduit means 35 and the inner conduit means 34. There is additionally shown the fluid passageway 37 which has a substantially annular configuration, but for the fact that the passageway is partitioned by annular segments. The baffle means 38 as shown in FIG. 36 is shown to cover about one-half of the annular passageway 37. Thus, the fluid mixture passing upward in annular passageway 37 is given a substantially upward flow direction but at the same time it is diverted back and forth in a horizontal manner. As noted hereinabove the baffle means 38 and the torturous path which is thereby provided in annular passageway 37 will enhance the mixing and contacting of hot effluent from the catalyst bed above with cold quench hydrogen to provide a more substantially uniform mixture at a more uniform temperature.

Referring now again to FIG. 4, it is seen that the open end of the outer conduit means 35 comprising the plurality of fluid openings 39 is located directly below the annular chamber 14 and the lower support plate 21, and that it is confined by a perforated means 44 which is supported upon a plurality of supporting bar members 45. This perforated section having an annular configuration is provided in large diameter reactor vessels in order to enhance the distribution of the fluid discharged from opening 39 more uniformly across the cross-sectional area of the reactor, thereby, providing for a more uniform flow of fluid into the catalyst bed below, not shown. In large diameter reactor vessels wherein perforated means 44 is not provided, the fluid mixture discharged from fluid openings 39 into open space 18 above the catalyst bed, would tend to channel down the central portion of the reactor vessel along the outer surface of the outer conduit means 35. In a very large diameter reactor vessel there would be a danger that no liquid hydrocarbon would ever reach any of the catalyst particles adjacent to the reactor shell 1. However, by providing the perforated annular section 44, a sufficient pressure drop is maintained so that the fluid mixture discharged via openings 39 into open space 18 above the catalyst bed, will be forced into a more uniform distribution across the entire cross-sectional area of the reactor and not concentrated in the center.

In the embodiment of the inventive fluid contacting apparatus which is shown in FIG. 4 there is again shown the lower section of the outer fluid conduit means 35 which contains a plurality of fluid openings 40. However, in the embodiment illustrated herein, there are no perforated means 41 across fluid openings 40 as was illustrated in the prior embodiments. Fluid openings 40 in the instant embodiment do not provide a passageway for fluid into the contacting apparatus immediately below. The openings 40 provide an access means for the installation and the maintenance of the conduit means 17 which provides communication between hydrogen quench port 4 and the fluid inlet port 13 of the catalyst support plate and fluid distribution apparatus below, upon which the embodiment shown is resting and supported. Thus, there is shown in FIG. 4 an embodiment wherein the reactor vessel contains a plurality of catalyst beds supported on a plurality of the contacting apparatus wherein each catalyst support plate member or upper deck comprises a perforated annular section 9 and an imperforate central section 10.

PREFERRED EMBODIMENTS

From the foregoing disclosure, it may now be readily ascertained that one preferred embodiment of the present invention may be characterized as a fluid contacting means which comprises in combination a support plate member comprising a perforate annular section encompassing a substantially imperforate center section; a confined central chamber attached to the support plate member comprising a central portion of the imperforate section, and having a plurality of first fluid openings spaced in the chamber wall; an annular chamber attached to the support plate member, comprising the perforate annular section, spaced around and apart from the central chamber in a manner sufficient to provide a first annular space between the chambers, and having a plurality of second fluid openings in the inner annular wall of the annular chamber; a first conduit means having a closed end spaced apart from the first annular space, and having an open end adjacent to the open end of the annular space; a second conduit means disposed within the first conduit means in a manner sufficient to provide a second annular space, and having a first open end adjacent to the closed end of the first conduit means, and having a second open end adjacent to the open end of the first conduit means; means for attaching the second open end of the second conduit means to the annular chamber in a manner sufficient to provide that the second conduit means is in communication with the first annular space and thereby with the first and second fluid openings, and that the open end of the first conduit means is isolated therefrom; means for attaching the first conduit means to the annular chamber; and, fluid conduit means communicating with the confined central chamber.

A further preferred embodiment of the present invention may be characterized as a fluid contacting means which comprises in combination a support plate member comprising a perforate center section encompassed by an imperforate annular section; a central chamber attached to the support plate member comprising the perforate center section, and having a plurality of first fluid openings spaced in the chamber wall; a confined annular chamber attached to the support plate member, comprising an outer annular portion of the imperforate annular section, spaced around and apart from the central chamber in a manner sufficient to provide a first annular space between the chambers, and having a plurality of second fluid openings in the inner annular wall of the annular chamber; a first conduit means having a closed end spaced apart from the first annular space and having an open end adjacent to the open end of the annular space; a second conduit means disposed within the first conduit means in a manner sufficient to provide a second annular space, and having a first open end adjacent to the closed end of of the first conduit means, and having a second open end adjacent to the open end of the first conduit means; means for attaching the second open end of the second conduit means to the annular chamber in a manner sufficient to provide that the second conduit means is in communication with the first annular space, and that the open end of the first conduit means is isolated therefrom; means for attaching the first conduit means to the annular chamber; and, fluid conduit means communicating with the confined annular chamber.

The manner of operation of the inventive fluid contacting and fluid distributing means is readily ascertainable to those skilled in the art from the teachings which have been presented hereinabove. In addition, the various elements of the inventive apparatus which have been set forth in the figures and in the discussion relating thereto, are readily apparent to those skilled in the art. It must be realized that the individual elements which are set forth in the separate embodiments shown in the figures, may be interchanged with each other in any of the several embodiments of the fluid contacting apparatus which have been disclosed herein.

The advantages to be accrued from the inventive apparatus are equally apparent from the foregoing disclosure. In particular, it will be seen that the inventive apparatus provides a means of directly contacting, mixing and thermally quenching a hot effluent leaving a particulated contact solids bed with a quench material. In addition, it will be seen that the inventive contacting apparatus provides a means of partitioning a single bed of particulated contact solids into a plurality of individually separate superimposed packed beds in a most effective manner while achieving the objective of contacting the two fluid streams. Furthermore, it well be seen that the inventive fluid contacting apparatus which partitions the catalyst beds into a plurality of individual beds, may be installed within the reactor vessel in a manner by which the apparatus is in no way attached to or supported from the external shell or wall of the reactor vessel, but that it is internally supported by its component elements.

It must be realized that the effectiveness of the apparatus and the contacting method will depend upon the specific environment in which the invention is utilized and in the specific dimensional design of the fluid distributing and contacting apparatus as it is specifically employed.

Those skilled in the art realize that for optimum operation, a high pressure drop is necessary in order to provide maximum turbulence resulting in optimum mixing, contacting, and redistribution of the fluids. The high pressure drop may be produced by providing minimum diameters and a minimum number of the fluid openings 12 and 15. In addition, the high pressure drop may be produced by providing a minimum distance between wall 25 of the central chamber and wall 24 (or 35 in FIGS. 4 through 6) of the annular chamber, so that annular space 16 provides only a very narrow fluid passageway. A high pressure drop may be further produced by providing a minimum distance between the inner and outer conduit means so that the fluid passageway 37 is a passageway of small dimension. Also, by providing a greater number of baffle means 38 within the annular passageway, pressure drop will be increased and mixing of the fluids will be enhanced.

While maximum pressure drop is desirable from a standpoint of optimum mixing and redistribution of the fluids, those skilled in the art will also realize that minimum pressure drop is desirable from a structural standpoint. Thus, if a high pressure drop is produced by the dimenional design of the inventive fluid contacting apparatus, a greater structural strength of the various elements of the apparatus must be provided in order to keep the inventive fluid contacting means from collapsing due to the pressure drop. Thus, the increased need for structural support requires a greater capital expense in fabricating the apparatus. In addition, those skilled in the art will realize that if a high pressure drop is provided in the apparatus, a greater compressor capacity is required in order to provide the hydrogen quench which has been illustrated as one of the fluids in the foregoing disclosure.

Thus, in summary a high pressure drop, while providing optimum contacting, mixing, and redistribution of the fluids, will also result in a higher capital cost and in a higher utility cost in operating the apparatus in the manner disclosed. Those skilled in the art must, therefore, strike a balance between these competing considerations.

In addition, it has been noted that the fluid openings 12 may be oriented so that they are positioned opposite an imperforate section of the annular wall 24. Additionally, the fluid openings 15 may be positioned so that they are opposite an imperforate section of the central chamber wall 25. In such an embodiment then it is preferred that the distance between wall 24 and wall 25 be minimized in order that the discharged fluid streams may impinge upon the opposite wall with the greatest force in order to produce a maximum amount of turbulence in the annular space 16.

However, as noted hereinabove, the preferred embodiment for the inventive apparatus comprises the apparatus wherein the fluid openings 12 and the fluid openings 15 are equal in number and in substantially axial radial alignment. In this embodiment, it is preferred that the distance between central chamber wall 25 and annular chamber wall 24 be minimized in order that the two fluid streams which are discharged from their respective fluid openings may axially impinge upon each other with a maximum of force, in order to provide optimum contacting and mixing of the fluids in the annular space 16.

Thus, the dimensions of the inventive fluid contacting and distributing apparatus, and the dimensions for the elements thereof cannot be set forth herein with great specificity since a great many factors will affect the pressure drop and thus the dimensions which are required in any specific environment. Among the factors to consider in a hydrocracking reactor, for example, are the rate of flow of the effluent from the catalyst bed above to the catalyst bed below as well as the rate of flow of the quench hydrogen. The distribution of the vapor and liquid phases of the effluent flowing from the bed above will also affect the dimensions which are required in the design of the inventive contacting apparatus, and the temperature and pressure of the effluent will have a pronounced effect upon the distribution of vapor and liquid phases. In addition, it must be realized that the temperature at which the quench hydrogen is introduced will also have a pronounced effect on the degree of thermal quench which is experienced and upon the pressure drop which will be produced. Finally, molecular weights of the two fluids must be considered and the density of the various vapor and liquid phases is a primary consideration in dimensionally sizing the contacting apparatus for optimum pressure drop in order to produce a substantially uniform mixing of the two fluid streams.

Those skilled in the art will readily ascertain that the factors and considerations which have been recited hereinabove are of equal importance in an upflow application of the apparatus as well as in a downflow application. Those skilled in the art can readily design the inventive apparatus for either upflow or downflow operation by utilizing the teachings that have been presented herein.

It will be noted that in the discussion above, the specific example comprises an illustration wherein a hydrocarbon was catalytically hydrocracked. It is well known to those skilled in the art that the catalyst will deteriorate as the operation proceeds so that catalyst activity and selectivity gradually becomes lower during the life of the catalyst. This then requires that the inlet temperature of the fluid entering via inlet port 2 be gradually increased over the life of the catalyst. This increase of temperature will cause a change in the vapor-liquid equilibrium of the effluent which is discharged from any given catalyst bed, thus causing a change in the hydraulics of the fluid distributing and contacting apparatus. In order to compensate for this change so that the effectiveness of mixing and quenching for the inventive apparatus is not lost, those skilled in the art will perceive that the temperature of the quench hydrogen can be changed, or that the rate of the quench hydrogen can be changed sufficiently so that the hydraulic balance necessary for the most effective operation of the inventive fluid contacting apparatus will remain in substantial equilibrium throughout the life of the catalyst.

While the embodiments disclosed herein above have been particularly directed to the catalytic reaction of hydrocarbons in a hydrogen atmosphere, the invention is not so limited. Those skilled in the art will perceive that the method of contacting two fluids in a fluid-solids contacting zone, and the apparatus therefor have equal application in any fluid-solids contacting zone such as an adsorption zone as well as a reaction zone. Additionally, the apparatus is not limited to the support of fixed beds of particulated contact solids, but it can also find application, for example, as the feed distribution apparatus at the top of the first bed contained within a downflow contacting chamber.

The method and apparatus also is not limited to the specific fluids disclosed hereinabove relative to hydrocracking operation. Thus, the first fluid and the second fluid illustrated in the above disclosure could individually comprise a liquid phase, a vapor phase, or a mixture of liquid and vapor phase. Those skilled in the art will realize that the inventive apparatus may have application where both fluid streams are liquid phases such as in a contacting operation in an extraction zone. Additionally, while the downflow embodiments of the inventive apparatus and the fluid contacting method have preferred application to fixed beds of particulated solids, the basic principle disclosed in the above embodiments may be easily adapted to fixed beds, fluidized beds, or ebullient beds in an upflow reaction system.

However, from the disclosure hereinabove, it will be readily apparent that the particularly preferred embodiment of the present invention comprises application of the inventive apparatus and contacting method wherein the fluid-solids contacting chamber is a downflow catalytic reaction zone for the processing of hydrocarbon constituents in the presence of hydrogen. Additionally, as noted hereinabove, specific application of the present invention is in downflow hydrogenation, hydrotreating, hydrocracking, and hydrodealkylation reaction zones wherein a hydrogen stream is utilized for the thermal quench of reactant hydrocarbon between catalyst beds.

It will be apparent to those skilled in the art that in such preferred applications, the pressure wherein the inventive apparatus and contacting method are functional will be in the range of from 100 p.s.i.g. to 3000 p.s.i.g. For example, in the hydrogenation of benzene to produce cyclohexane, a pressure range of from 100 p.s.i.g. to 500 p.s.i.g. is normally utilized. In the hydrotreating of light hydrocarbon fractions such as gasoline or naphtha to saturate olefins and to remove sulfur, nitrogen, oxygen, metallic, and other impurities, a pressure in the range of from 100 p.s.i.g. to 1000 p.s.i.g. is typically utilized. In the hydrotreating or hydrocracking of hydrocarbon fractions heavier than naphtha such as kerosines, gas oils, cycle oils, reduced crudes, etc., pressures in the range of from 100 p.s.i.g. to 3000 p.s.i.g. may be utilized. In the hydrodealkylation of alkylbenzenes to produce benzene, a pressure in the range of from 300 p.s.i.g. to 1000 p.s.i.g. is normally employed.

In addition, those skilled in the art will realize that for these processes the inventive apparatus and contacting method will be utilized at a temperature in the range of from 300° F. to 1500° F. For example, in the hydrogenation of benzene to produce cyclohexane, a temperature range of from 300° F. to 600° F. is normal. In the hydrotreating of light hydrocarbons such as gasoline or naphtha fractions, a temperature range of from 500° F. to 900° F. is typically utilized. In the hydrotreating, or hydrocracking of hydrocarbon fractions heavier than naphtha, a temperature range of from 500° F. to 1000° F. may be employed. In the hydrodealkylation of alkylbenzenes to produce benzene, temperatures in the range of from 1000 to 1500° F. may be utilized.

In these hydrocarbon processes wherein the inventive apparatus and contacting method find particular utility, the beds of particulated or contact solids will normally comprise hydrocarbon conversion catalyst containing one or more metallic components selected from Group VI-B and Group VIII of the Periodic Table (Periodic Table, Handbook of Chemistry and Physics, 43d Edition). These metallic components are typically supported on a refactory inorganic oxide having a pilled, spherical, or extruded form although any granular or particulated form may be employed. Typical support materials of this type are alumina, silica, magnesia, zirconia, kieselguhr, diatomaceous earth, etc., either singly or in combination. A typical hydrogenation catalyst will comprise a Group VIII metal on the refratory inorganic oxide, and a preferred catalyst for hydrogenation of aromatic hydrocarbons comprises nickel on kieselguhr. A typical hydrotreating catalyst will contain silica and alumina and a Group VIII metal or a Group VI-B metal or a combination of metals thereof. One preferred hydrotreating catalyst comprises silica, alumina, nickel, molybdenum, and cobalt. A typical hydrocracking catalyst will contain at least one metallic component selected from the metals of Group VI-B and Group VIII such as platinum, palladium, nickel, or molybdenum and a composite of silica-alumina. A typical catalyst for the hydrodealkylation of alkyl aromatics will comprise a Group VI-B metal such as chromium, molybdenum, or tungsten on the refractory inorganic oxide support material and one particularly preferred catalyst comprises chromium oxide on silica-alumina.

In summary, therefore, a further preferred embodiment of the present invention may be characterized as a method for contacting two fluids in a fluid-solids contacting zone which comprises passing first fluid at a first temperature into an annular chamber having a plurality of first fluid openings in the inner annular wall of the chamber; passing second fluid at a second temperature into a central chamber having a plurality of second fluid openings in the chamber wall; discharging the first fluid from the first fluid openings into an annular space between the annular chamber and the central chamber; discharging the second fluid from the second fluid openings into the annular space whereby first and second fluids are directly contacted and a mixture of first and second fluids is produced; passing the mixture from the first annular space into a first conduit means in a first direction of flow; passing the mixture from the first conduit means into a second conduit means enclosing and containing the first conduit means in a manner sufficient to provide an annular passageway confined between the first and second conduit means; passing the mixture into the annular passageway in a second direction of flow substantially countercurrent to the first direction of flow, whereby additional contacting of the first and second fluids is produced within the mixture; and discharging the mixture from the annular passageway into a bed of particulated solids at a third temperature intermediate to the first and second temperatures.

Furthermore, it may be summarized that a particularly preferred embodiment of the present invention may be characterized as the method discussed in the paragraph immediately above wherein the contacting zone comprises a catalytic reaction zone, the first fluid comprises hydrocarbon, the second fluid comprises hydrogen, and the bed of particulated solids comprises one of the group consisting of a hydrogenation catalyst, a hydrotreating catalyst, a hydrocracking catalyst, and a hydrodealkylation catalyst.

The invention claimed:

1. A fluid contacting means which comprises in combination:
  (a) a central chamber having a plurality of first fluid openings spaced in the chamber wall;
  (b) an annular chamber spaced around and apart from said central chamber having a plurality of second fluid openings spaced in the inner annular wall of said annular chamber;
  (c) means for attaching said central member to said annular chamber, said means providing a first annular space having communication with said first and second fluid openings, and having one closed end and one open end;
  (d) a first conduit means having a closed end spaced apart from said first annular space, and having an open end adjacent to the open end of said annular space;
  (e) a second conduit means disposed within said first conduit means, said first and second conduit means providing a second annular space, said second annular space having a first open end adjacent to the closed end of said first conduit means, and having a second open end adjacent to the first conduit means;
  (f) means for attaching said second open end of said second conduit means to said annular chamber, said attaching means having means placing said second conduit means in communication with said first annular space, said open end of said first conduit means being isolated therefrom;
  (g) means for attaching said first conduit means to said annular chamber;
  (h) a first fluid passageway communicating with said central chamber; and,
  (i) a second fluid passageway communicating with said annular chamber.

2. The fluid contacting means of claim 1 wherein said first conduit means is attached to said second conduit means.

3. The fluid contacting means of claim 1 wherein said second annular space contains baffle means.

4. The fluid contacting means of claim 3 wherein said baffle means comprise annular sectors positioned at a plurality of loci within said second annular space.

5. The fluid contacting means of claim 1 wherein said first and second fluid openings are equal in number and are in substantially axial alignment.

6. The fluid contacting means of claim 5 wherein said central chamber is a cylindrical chamber, said first fluid openings are radially spaced substantially uniformly in said cylindrical chamber wall, and said second fluid openings in the inner wall of said annular chamber are in substantially axial radial alignment with said first fluid openings.

7. The fluid contacting means of claim 1 wherein perforate means encompass the open end of said first conduit means.

8. The fluid contacting means of claim 7 wherein said perforate means comprises a plate member encompassing the open end of said first conduit means, spaced apart from said annular chamber, and containing a perforate annular section.

9. The fluid contacting means of claim 1 wherein said annular chamber is partitioned into a plurality of sectors, and each sector contains at least one of said second fluid openings.

10. The fluid contacting means of claim 1 wherein said first fluid passageway comprises conduit means, and said second fluid passageway comprises perforate means in a wall of said annular chamber isolated from said first annular space, said second annular space, and said open end of the first conduit means.

11. The fluid contacting means of claim 1 wherein said second fluid passageway comprises conduit means, and said first fluid passageway comprises perforate means in a wall of said central chamber isolated from said first annular space.

12. A fluid contacting chamber which comprises in combination:
  (a) a vertically elongated confined chamber having at least one upper fluid port and one lower fluid port to provide for a generally vertical flow of fluid therethrough;
  (b) a plurality of horizontally positioned support plate members spaced within said elongated chamber and partitioning said elongated chamber into a plurality of isolated zones;
  (c) a confined central chamber attached to each support plate member having a plurality of first fluid openings spaced in the chamber wall;
  (d) an annular chamber attached to each support plate member spaced around and apart from said central chamber thereby to provide a first annular space between said chambers and having a plurality of second fluid openings in the inner annular wall of said annular chamber;
  (e) a first conduit means attached to each annular chamber having a closed end spaced apart from said first annular space, and having an open end adjacent thereto;
  (f) a second conduit means having both ends open disposed within each first conduit means thereby to provide a second annular space, and means providing communication between said annular chambers whereby said second conduit means is in communication with said first annular space and said first and second fluid openings, the open end of the associated first conduit means being isolated therefrom;
  (g) a first fluid passageway communicating with each confined central chamber; and,
  (h) a second fluid passageway communicating with each annular chamber.

13. The fluid contacting chamber of claim 12 wherein each confined central chamber, annular chamber, associated first conduit means, and second conduit means is positioned below the support plate member.

14. The fluid contacting chamber of claim 13 wherein the lowest of the plurality of first conduit means is supported upon the bottom of said vertically elongated confined chamber, and each upper first conduit means of the plurality is supported upon one of said support plate members.

15. The fluid contacting chamber of claim 13 wherein sadi beds of particulated solids comprise fixed beds. contacting chamber, and said support plate members hold and retain particulated contact solids in a plurality of separate superimposed beds.

16. The fluid contacting chamber of claim 15 wherein said beds of particulated solids comprise fixed beds.

17. The fluid contacting chamber of claim 15 wherein said beds of particulated solids comprise a hydrocarbon conversion catalyst.

18. The fluid contacting chamber of claim 12 wherein said second annular space contains baffle means.

19. The fluid contacting chamber of claim 18 wherein said baffle means comprise annular sectors positioned at a plurality of loci within said second annular space.

20. The fluid contacting chamber of claim 12 wherein said first and second fluid openings of said associated central and annular chambers are equal in number and are in substantially axial alignment.

21. The fluid contacting chamber of claim 20 wherein each central chamber is a cylindrical chamber, said first fluid openings are radically spaced substantially uniformly in said cylindrical chamber wall, and said second fluid openings in the inner wall of said chamber are in substantially axial radial alignment with the first fluid openings.

22. The fluid contacting chamber of claim 12 wherein perforate means encompasses the open end of said first conduit means.

23. The fluid contacting chamber of claim 22 wherein said perforate means comprises a plate member encompassing the open end of each first conduit means, spaced apart from the annular chamber, and containing a perforate annular section.

24. The fluid contacting chamber of claim 12 wherein said annular chamber is partitioned into a plurality of sectors, and each sector contains at least one of said second fluid openings.

25. The fluid contacting chamber of claim 12 wherein each first fluid passageway comprises conduit means for supplying fluid to the central chamber, and each second fluid passageway comprises perforate means in a wall of the annular chamber isolated from the first annular space, the second annular space, and the open end of the first conduit means.

26. The fluid contacting chamber of claim 12 wherein each second fluid passageway comprises conduit means for supplying fluid to the annular chamber, and each first fluid passageway comprises perforate means in a wall of the central chamber isolated from the first annular space.

References Cited

UNITED STATES PATENTS 2,865,721  12/1958  Lane et al. _____ 23—288
3,433,600  3/1969   Christensen et al. _____ 23—288

JAMES H. TAYMAN, Jr., Primary Examiner

U.S. Cl. X.R.

23—1, 284, 283; 261—97, 111; 208—146; 260—668, 690